United States Patent
Umeda

(10) Patent No.: US 11,816,923 B2
(45) Date of Patent: Nov. 14, 2023

(54) FACE IMAGE CANDIDATE DETERMINATION APPARATUS FOR AUTHENTICATION, FACE IMAGE CANDIDATE DETERMINATION METHOD FOR AUTHENTICATION, PROGRAM, AND RECORDING MEDIUM

(71) Applicant: NEC Solution Innovators, Ltd., Tokyo (JP)

(72) Inventor: Kazuhide Umeda, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 333 days.

(21) Appl. No.: 17/273,751

(22) PCT Filed: Sep. 6, 2019

(86) PCT No.: PCT/JP2019/035250
§ 371 (c)(1),
(2) Date: Mar. 5, 2021

(87) PCT Pub. No.: WO2020/050413
PCT Pub. Date: Mar. 12, 2020

(65) Prior Publication Data
US 2021/0334520 A1    Oct. 28, 2021

(30) Foreign Application Priority Data
Sep. 6, 2018    (JP) .................. 2018-167128

(51) Int. Cl.
*G06V 40/16* (2022.01)
*G06F 18/2113* (2023.01)

(52) U.S. Cl.
CPC .......... *G06V 40/16* (2022.01); *G06F 18/2113* (2023.01); *G06V 40/168* (2022.01); *G06V 40/172* (2022.01); *G06V 40/179* (2022.01)

(58) Field of Classification Search
CPC ........ G06T 7/00; G06F 18/2113; G06F 21/32; G06V 40/16; G06V 40/168; G06V 40/172; G06V 40/179
See application file for complete search history.

(56) References Cited

U.S. PATENT DOCUMENTS

2013/0247175 A1 * 9/2013 Nechyba ................ G06V 40/16
726/19
2021/0174065 A1 6/2021 Kumagai

FOREIGN PATENT DOCUMENTS

CN   103136533 A   6/2013
CN   107590474 A   1/2018
(Continued)

OTHER PUBLICATIONS

Wan et al, "Occlusion Robust Face Recognition Based On Mask Learning", IEEE, 2017 (Year: 2017).*
(Continued)

*Primary Examiner* — Ruiping Li

(57) ABSTRACT

An apparatus for face image candidate determination for authentication, including a storage and at least one processor wherein the storage stores a reference face image in association with an attribute of the image for each registered person and a score threshold value for each combination of attributes of face images to be collated. The processor configured to: acquire a face image of a person to be determined as a face image for determination, determine an attribute of the face image, collate the reference face image with the face image and calculates a score indicating a degree of matching, and select a reference face image satisfying the score threshold value as a face image candidate for authentication and selects the face image candidate and the score thereof as authentication information of the face image for determination.

13 Claims, 3 Drawing Sheets

(56) References Cited

FOREIGN PATENT DOCUMENTS

| | | |
|---|---|---|
| JP | 2012-160001 A | 8/2012 |
| JP | 2013-210824 A | 10/2013 |
| WO | 2018/116373 A1 | 6/2018 |

OTHER PUBLICATIONS

International Search Report for PCT Application No, PCT/JP2019/035250, dated Nov. 19, 2019.
Singapore Office Action for Singapore Application No. 11202102210T, dated Aug. 1, 2022.
Japanese Office Action for JP Application No. 2020-541324 dated Jan. 18, 2022 with English Translation.

* cited by examiner

FACE IMAGE CANDIDATE DETERMINATION APPARATUS FOR AUTHENTICATION, FACE IMAGE CANDIDATE DETERMINATION METHOD FOR AUTHENTICATION, PROGRAM, AND RECORDING MEDIUM

This application is a National Stage Entry of PCT/JP2019/035250 filed on Sep. 6, 2019, which claims priority from Japanese Patent Application 2018-167128 filed on Sep. 6, 2018, the contents of all of which are incorporated herein by reference, in their entirety.

TECHNICAL FIELD

The present invention relates to a face image candidate determination apparatus for authentication, a face image candidate determination method for authentication, a program, and a recording medium.

BACKGROUND ART

In various fields, personal authentication by face image analysis (hereinafter, referred to as face image authentication) is used. In the face image authentication, a face image of a registered person is stored in advance as a master image, a face image of a person to be authenticated obtained in live as a query image is collated with the master image, and a person to be authenticated is authenticated as the registered person when the face image matches the master image.

SUMMARY OF INVENTION

However, the query image is not always a face image captured in a state in which the modeling of the face of the person to be authenticated can be clearly identified, for example, as in a certification photograph, and may be in various states such as a face with a hat, a face with a mask or sunglasses, a profile, a look-up face, a look-down face, and the like. Similarly, the master image is not always a face image such as the certification photograph. Therefore, depending on the state of the master image and the query image, the accuracy of face image authentication may not be sufficient.

With the foregoing in mind, it is an object of the present invention to provide a face image candidate determination system for authentication that can improve the accuracy of face image authentication finally performed.

More specifically, it is an object of the present invention to provide a face image candidate determination apparatus for authentication, a face image candidate determination method for authentication, a program, and a recording medium in the above system.

Solution to Problem

In order to achieve the aforementioned object, the present invention provides a face image candidate determination apparatus, including: a storage unit; an image acquisition unit; an attribute determination unit; a score calculation unit; and a selection unit, wherein the storage unit includes: a reference storage unit; and a threshold value storage unit, the reference storage unit stores a reference face image in association with an attribute of the reference face image for each registered person, the threshold value storage unit stores a score threshold value for each combination of attributes of face images to be collated, the attribute is an attribute based on a feature of the face image, the score threshold value is a threshold value for determining that face images to be collated are likely to be of the same person, the image acquisition unit acquires a face image of a person to be determined as a face image for determination, the attribute determination unit determines an attribute of the face image for determination, the score calculation unit collates the reference face image with the face image for determination and calculates a score indicating a degree of matching, and the selection unit selects a reference face image satisfying the score threshold value as a face image candidate for authentication and selects the face image candidate and a calculated score thereof as authentication information of the face image for determination.

The present invention also provides a face image candidate determination method, including the steps of: storing; acquiring an image; determining an attribute; calculating a score; and selecting, wherein the storing includes the steps of: storing a reference; and storing a threshold value, the reference-storing stores a reference face image in association with an attribute of the reference face image for each registered person, the threshold value-storing stores a score threshold value for each combination of attributes of face images to be collated, the attribute is an attribute based on a feature of a face image, the score threshold value is a threshold value for determining that face images to be collated are likely to be of the same person, the image-acquiring acquires a face image of a person to be determined as a face image for determination, the attribute-determining determines an attribute of the face image for determination, the score-calculating collates the reference face image with the face image for determination and calculates a score indicating a degree of matching, and the selecting selects a reference face image satisfying the score threshold value as a face image candidate for authentication and selects the face image candidate and a calculated score thereof as authentication information of the face image for determination.

The present invention also provides a program for a computer to execute the face image candidate determination method according to the present invention.

The present invention also provides a computer readable recording medium with the program according to the present invention.

Advantageous Effects of Invention

According to the present invention, for example, the accuracy of face image authentication finally performed can be improved.

DESCRIPTION OF EXAMPLE EMBODIMENTS

Figure 1:
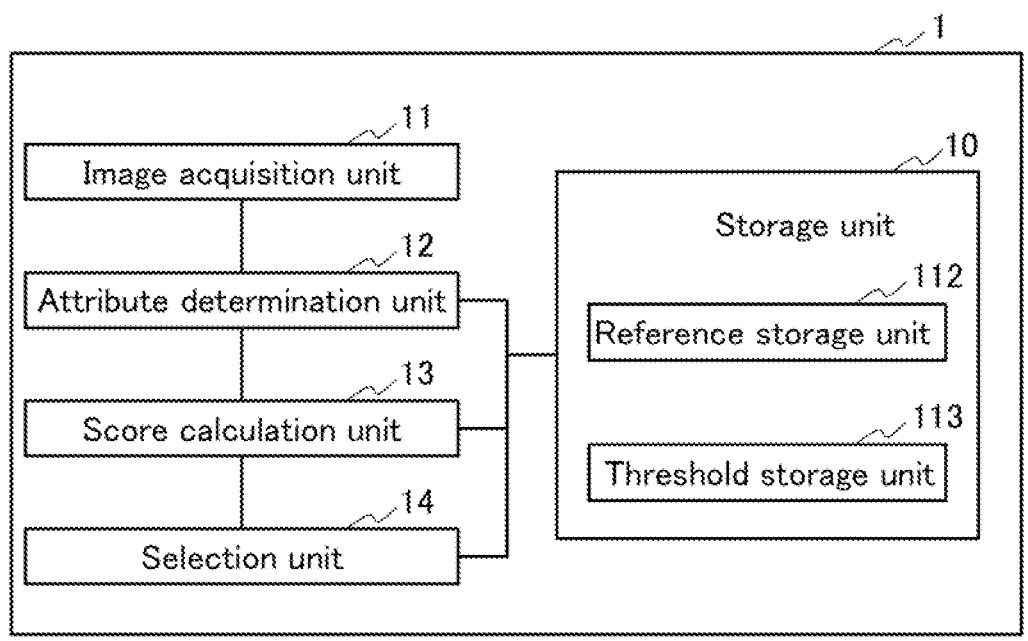
FIG. 1 is a block diagram showing an example of a face image candidate determination apparatus according to the first example embodiment.

Hereinafter, in the present invention, the reference face image is also referred to as a "master image" and the face image for determination is also referred to as a "query image".

In the face image authentication, as described above, the query image obtained in live is collated with the master image registered in advance, and a person to be authenticated is authenticated as the registered person when the query image matches the master image. At this time, in general, multiple face images are registered for each of registered persons as the master image. When collating the master image with the query image, for example, a feature point is first extracted from the query image, and then the same feature point is searched for in multiple master images, and the master image having the feature point is selected as a master image candidate for personal authentication. Further, the query image is authenticated as the person of the master image candidate having the highest degree of matching with the query image among multiple master image candidates. The inventors of the present invention have found that the accuracy of the face image authentication is influenced by the method of selecting the master image candidate. For example, in the case where the query image is an image of a face with a hat and the hat is extracted as a feature point, only master images having a feature point of a hat are selected from multiple master images as the master image candidates. If the person X of the query image did not register the master image of a face with a hat as a registered person X, since the feature point of the hat cannot be extracted from the master image of the registered person X even though the person X is the registered person X, the master image of the registered person X is not selected as the master image candidate. That is, the master image of the person X falls outside the candidate. Therefore, even if authentication is performed based on the degree of matching with the master image candidates, the authentication may result in an error. To cope with such a problem, for example, it is conceivable that a registered person registers a large amount of master images in all states, but this is not practical. Further, even if the degree of matching between the master image and the query image is high, if they are face images with which details of faces are not easily identified, authentication may result in an error even if the query image is authenticated as the person of the master image.

Therefore, the inventors of the present invention have focused on the attributes of face images and the combination of attributes of face images to be collated, and have reached the present invention. The attribute of the face image is an attribute based on a feature of the face image, and is a feature of a face and a feature about a face that can be feature points as described above, and specific examples of the attribute include a face orientation (e.g., a front face, a profile), a facial expression (e.g., a smiling face), and a wearing object on the face (e.g., sunglasses, a mask) to be described below. Examples of the combination of attributes include a front face and a front face, a front face and a face with sunglasses, and a face with sunglasses and a face with sunglasses. When assuming that the score indicating the degree of matching between a front face image (master) and a front face image (query) is 60% and that the score indicating the degree of matching between an image of a face with sunglasses (master) and an image of a face with sunglasses (query) is also 60%, while the degree of matching is the same for each of the combinations, as compared to 60% matching degree between the front face images in which the details of the face are clear, 60% matching degree between the images of the faces with sunglasses in which the eyes cannot be recognize is considered to be unreliable as the possibility that the two face images to be collated are of the same person. That is, when it is determined that there is a possibility of the same person by the combination of the attributes of the two face images to be collated, the threshold value of the degree of matching can be set for each.

Therefore, in the present invention, first, the reference face image of the registered person and the attribute of the reference face image are stored in association with each other as the information of the reference face image serving as the master image, and further, freely set score threshold value is stored for each combination of the attributes of both face images in the case where the face images are collated. On the other hand, an attribute is determined for the face image for determination serving as the query image, and regardless of the attribute of the face image for determination and the attribute of the reference face image, the face image for determination is collated with the reference face image, and a score indicating the degree of matching is calculated. Then, it is determined whether or not the score satisfies the threshold value of the combination in accordance with the combination of the attributes of the face image for determination and the reference face image, which are collated with each other, and when the score satisfies the threshold value, the reference face image is selected as a face image candidate for authentication. According to this, as described above, even if the registered person whose reference face image (master) having the feature point of the face image for determination (query) is not stored, it is possible to prevent the registered person from falling outside the candidate, and to suppress the registered person from missing from the candidate. Further, even if at least one of the face image for determination (query) and the reference face image (master) is a face image in which the details of the face is not easily identified, since the threshold value is set according to the combination of the attributes of both, it is possible to prevent the face image from being selected as a face image candidate for authentication simply because of, for example, a high degree of matching. Therefore, by using the face image candidate obtained by the present invention, it is possible to consequently improve the accuracy of the personal authentication.

In the present invention, as described above, examples of the attribute include a face orientation, a facial expression, and a wearing object on the face. Examples of the face orientation include a front face, a profile, a look-down face, a look-up face, an obliquely right profile, and an obliquely left profile. Examples of the facial expression include a smiling face and a straight face. Examples of the wearing object on the face include a hat, a mask, and sunglasses.

Embodiments of the present invention will be described with reference to the drawings. Note here that the present invention is not limited to the following example embodiments. In the drawings, identical parts are indicated with identical reference signs. Each example embodiment can be described with reference to the descriptions of other example embodiments, unless otherwise specified, and the configurations of the example embodiments may be combined, unless otherwise specified.

First Example Embodiment

An example of the face image candidate determination apparatus and the face image candidate determination method of the present invention will be described with reference to the drawings.

FIG. 1 is a block diagram showing the configuration of an example of a face image candidate determination apparatus 1 according to the first example embodiment of the present invention. With reference to FIG. 1, the face image candidate determination apparatus 1 includes a storage unit 10, an image acquisition unit 11, an attribute determination unit 12, a score calculation unit 13, and a selection unit 14. The face image candidate determination apparatus 1 is also referred to as a face image candidate determination system, for example. The face image candidate determination apparatus 1 is not limited to the above-described configuration, and may include, for example, an extraction unit, an output unit, and the like.

The face image candidate determination apparatus 1 may be, for example, a single face image candidate determination apparatus including the above-described components, or may be a face image candidate determination apparatus to which the components are connectable via a communication network. The communication network is not particularly limited, and a known network can be used, and may be, for example, a wired network or a wireless network. Examples of the communication network include an Internet line, a telephone line, a local area network (LAN), and a wireless fidelity (WiFi).

Figure 2:
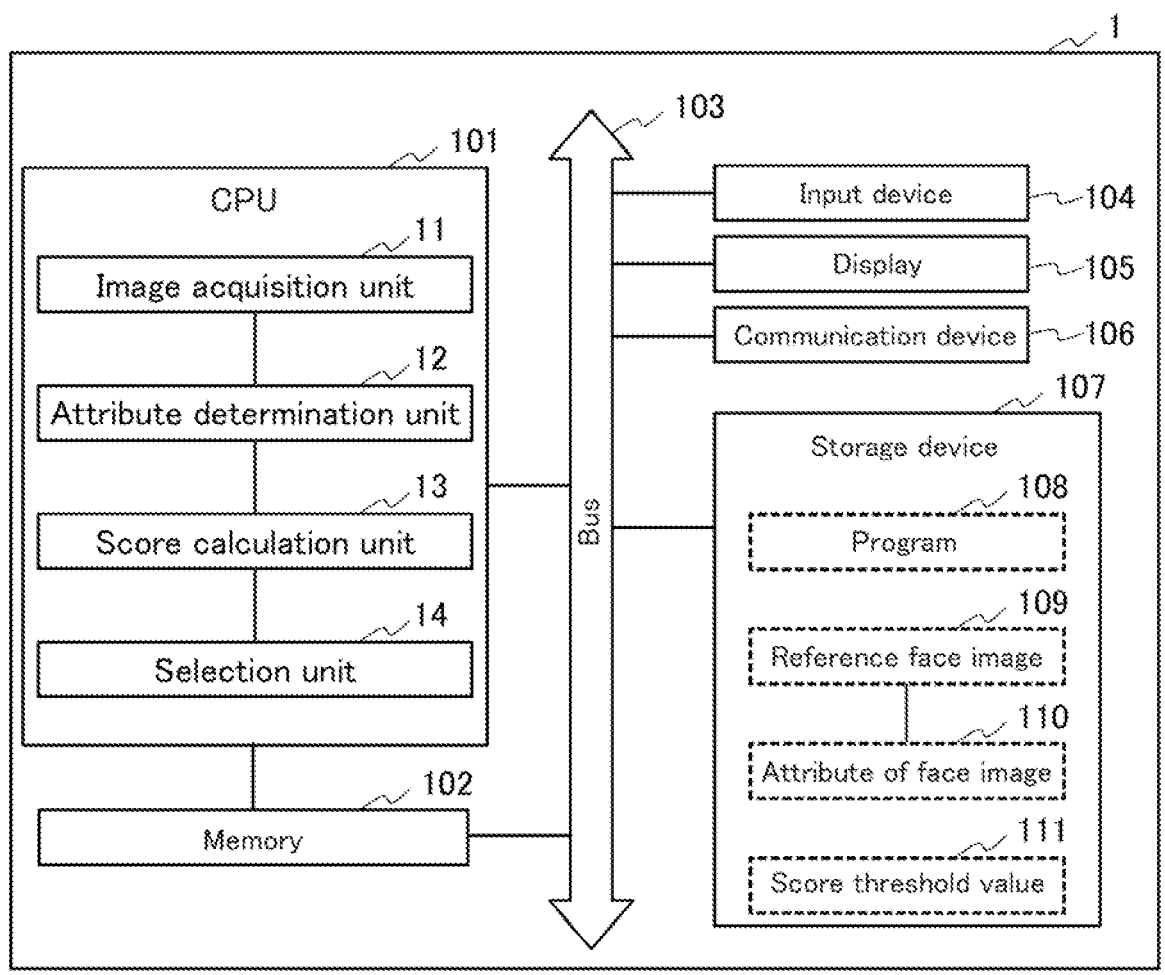
FIG. 2 is a block diagram showing an example of a hardware configuration of the face image candidate determination apparatus according to the first example embodiment.

FIG. 2 is a block diagram illustrating a hardware configuration of the face image candidate determination apparatus 1 of FIG. 1. With reference to FIG. 2, the face image candidate determination apparatus 1 includes, for example, a central processing unit (CPU) 101, a memory 102, a bus 103, an input device 104, a display 105, a communication device 106, a storage device 107, and the like. In the hardware configuration, the components are connected to each other via the bus 103 by, for example, respective interfaces (I/F).

CPU 101 serves to control the entire control of the face image candidate determination apparatus 1. In the face image candidate determination apparatus 1, the CPU 101 executes a program 108 of the present invention and other programs, and reads and writes various pieces of information, for example. Specifically, for example, the CPU 101 of the face image candidate determination apparatus 1 functions as the image acquisition unit 11, the attribute determination unit 12, the score calculation unit 13, and the selection unit 14.

The face image candidate determination apparatus 1 can be connected to a communication network by, for example, a communication device 106 connected to the bus 103, and can also be connected to an external device via the communication network. The external device is not particularly limited and examples thereof include an imaging device such as a camera, an external terminal in which captured face images are stored. Examples of the external terminal include a personal computer (PC), a tablet, and a smart phone. The connection method between the face image candidate determination apparatus 1 and the external device is not particularly limited, and may be, for example, a wired connection or a wireless connection. The wired connection may be, for example, a cord connection or a cable connection for using a communication network. The wireless connection may be, for example, a connection using a communication network or a connection using wireless communication. The communication network is not particularly limited, and, for example, a known communication network can be used, which is the same as described above. The connection form between the face image candidate determination apparatus 1 and the external device may be, for example, a USB or the like.

The memory 102 includes, for example, a main memory, and the main memory is also referred to as a main storage device. When the CPU 101 performs processing, the memory 102 reads various kinds of operation programs 108 such as the program of the present invention stored in an auxiliary storage device to be described below, and the CPU 101 receives data from the memory 102 and executes the program. The main memory is, for example, a random access memory (RAM). The memory 102 further includes, for example, a read-only memory (ROM).

The storage device 107 is also referred to as, for example, a so-called auxiliary storage device relative to the main memory (main storage device). The storage device 107 includes, for example, a storage medium and a drive for reading from and writing to the storage medium. The storage medium is not particularly limited, and may be, for example, a built-in type or an external type, and examples thereof include a hard disk (HD), a floppy® disk (FD), a CD-ROM, a CD-R, a CD-RW, an MO, a DVD, a flash memory, and a memory card. The drive is not particularly limited. Examples of the storage device 107 include a hard disk drive (HDD) in which the storage medium and the drive are integrated and a solid state drive (SSD). The storage device 107 stores, for example, an operation program such as the program 108 of the present invention. The storage device 107 is a storage unit 10, stores, for example, the reference face image 109 of the registered person in association with the attribute 110 of the reference face image, and stores a score threshold value 111 for each combination of attributes of face images to be collated. The score threshold value 111 will be described below.

The face image candidate determination apparatus 1 further includes, for example, an input device 104 and a display 105. Examples of the input device 104 include a touch panel, a keyboard, and a mouse. Examples of the display 105 include an LED display and a liquid crystal display.

Next, each component of the face image candidate determination apparatus 1 will be described. First, the storage unit 10 includes a reference storage unit 112 and a threshold value storage unit 113, the reference storage unit 112 stores a reference face image in association with an attribute of the reference face image for each registered person, and the threshold value storage unit 113 stores a score threshold value for each combination of attributes of face images to be collated.

The image acquisition unit 11 acquires a face image of a person to be determined as a face image for determination. The face image for determination is a face image used as a query image in the face image authentication, for example. The image acquisition unit 11 may be, for example, an imaging unit that captures a face image or an input unit that inputs a captured face image. When the image acquisition unit 11 is the imaging unit, it may be, for example, the camera. When the image acquisition unit 11 is the input unit, the face image candidate determination apparatus 1 may be electrically connected to the camera, for example, and the face image information captured by the camera may be input. The connection between the face image candidate determination apparatus 1 and the camera is not particularly limited, and may be, for example, wired or wireless. The face image candidate determination apparatus 1 and the camera can be connected via, for example, a communication network, and the communication network is not particularly limited, and is, for example, as described above.

The attribute determination unit 12 determines the attribute of the face image for determination. As the attribute of the face image for determination, for example, a known image analysis unit can be used.

The score calculation unit 13 collates the reference face image with the face image for determination, and calculates a score indicating the degree of matching. The degree of matching means the extent of matching, for example, and can also be referred to as similarity. The score is, for example, an indicator that relatively indicates the degree of matching. As the degree of matching, for example, a known similarity calculation can be used. The collation method by the score calculation unit 13 is not particularly limited, and for example, a known face authentication method such as a method using a ratio of distances between feature points such as eyes, nose, and mouth, a feature amount such as an orientation of the line connecting the feature points, or the like can be used.

For calculation of the score, for example, machine learning, AI, and the like can be used. In this case, for example, by combining the reference face images of various attributes and the face images for determination of various attributes as the learning data, and using the results of whether or not they are of the same person to perform machine learning, AI, and the like learn, it is possible to produce a learning model regarding the reliability of determination of whether or not the attribute of the reference face image and the attribute of the face image for determination are of the same person. By using such a learning model, for example, it is possible to calculate a score with higher reliability.

The selection unit 14 selects a reference face image satisfying the score threshold value as a face image candidate for authentication, and selects the face image candidate and the calculated score thereof as authentication information. As described above, since the reference face image is stored in association with the attribute and the attribute of the face image for determination is determined, based on them, the combination of attributes between face images to be collated is obvious. Therefore, among the reference face images, those satisfying the threshold value corresponding to the combination between the face images are selected as face image candidates for authentication.

The score threshold value can be arbitrarily determined, for example, according to the attribute of the face image, as described above. For example, since the front face image is clear in the features of the face such as eyes, nose, and mouth, it can be said to be a highly reliable face image in collation as compared to an image of a face with a mask in which most of the face is hidden, an image of a face with sunglasses in which the eyes are hidden, or the like. Further, for example, in the case where the face image for determination is the image of the face with sunglasses, the image of the face with sunglasses has more feature points that can be collated between the images as compared to the case where the reference face image is the image of the face with a mask, and the image of the face with sunglasses can be said to be a highly reliable face image. In this manner, for example, the score threshold value can be set from the viewpoint of the reliability of the face image, the number of feature points that can be collated between the reference face image and the face image for determination, and the like. For example, the score threshold value can be set relatively lower as the reliability of the face image is relatively higher, and the score threshold value can be set lower as the number of feature points that can be collated between the reference face image and the face image for determination is relatively higher. The reference face image and the face image for determination can be collated by, for example, an existing collation engine (collation soft). In general, it is known that even in the same combination of the reference face image and the face image for determination, the score indicating the degree of matching differs depending on the type of the collation engine. For this reason, it is preferable to set the score threshold value according to, for example, a collation engine used for collation.

Specifically, the score threshold value can be set, for example, as in Table 1 below. Table 1 below is mere an example, and does not limit the present invention in any way. The score threshold value can be freely set from the viewpoint as described above, for example. In Table 1 below, the "front face (with no wearing object)" is, for example, an image of a front face with no wearing object such as a hat, sunglasses, or the like.

| | | Face image for determination | | | | | | | |
|---|---|---|---|---|---|---|---|---|---|
| | | Front face (with no wearing object) | Hat | Look-down face | Obliquely right profile | Obliquely left profile | Look-up face | Sunglasses | Mask |
| Reference face image | Front face (with no wearing object) | 70 | 70 | 70 | 70 | 70 | 70 | 60 | 50 |
| | Hat | 68 | 70 | 65 | 65 | 65 | 65 | 50 | 45 |
| | Look-down face | 65 | 65 | 70 | 65 | 65 | 65 | 50 | 45 |
| | Obliquely right profile | 65 | 65 | 65 | 70 | 65 | 65 | 50 | 45 |
| | Obliquely left profile | 65 | 65 | 65 | 65 | 70 | 65 | 50 | 45 |
| | Look-up face | 65 | 60 | 65 | 65 | 65 | 70 | 50 | 45 |
| | Sunglasses | 55 | 50 | 50 | 50 | 50 | 50 | 70 | 45 |
| | Mask | 50 | 50 | 50 | 45 | 45 | 45 | 45 | 70 |

Next, the face image candidate determination method according to the first example embodiment will be described. The face image candidate determination method of the present example embodiment can be performed using the face image candidate determination apparatus 1 shown in FIGS. 1 and 2, for example. Note that the face image candidate determination method according to the first example embodiment of the present invention is not limited to the use of the face image candidate determination apparatus 1. Regarding the face image candidate determination apparatus 1 described above, reference can be made to the description of the face image candidate determination method of the present example embodiment.

The storing includes the steps of: storing a reference; and storing a threshold value. The reference-storing stores a reference face image in association with an attribute of the reference face image for each registered person. The threshold value-storing stores a score threshold value for each combination of attributes of face images to be collated. The storing can be performed by, for example, the storage unit 10 of the face image candidate determination apparatus 1.

The image-acquiring acquires a face image of a person to be determined as a face image for determination. The image-acquiring can be performed by, for example, the image acquisition unit 11 of the face image candidate determination apparatus 1.

The attribute-determining determines an attribute of the face image for determination. The attribute-determining can be performed by, for example, the attribute determination unit 12 of the face image candidate determination apparatus 1.

The score-calculating collates the reference face image with the face image for determination and calculates a score indicating the degree of matching. The score-calculating can be performed by, for example, the score calculation unit 13 of the face image candidate determination apparatus 1.

The selecting selects a reference face image satisfying the score threshold value as a face image candidate for authentication and selects the face image candidate and a calculated score thereof as authentication information of the face image for determination. The selecting can be performed by, for example, the selection unit 14 of the face image candidate determination apparatus 1.

Figure 3:
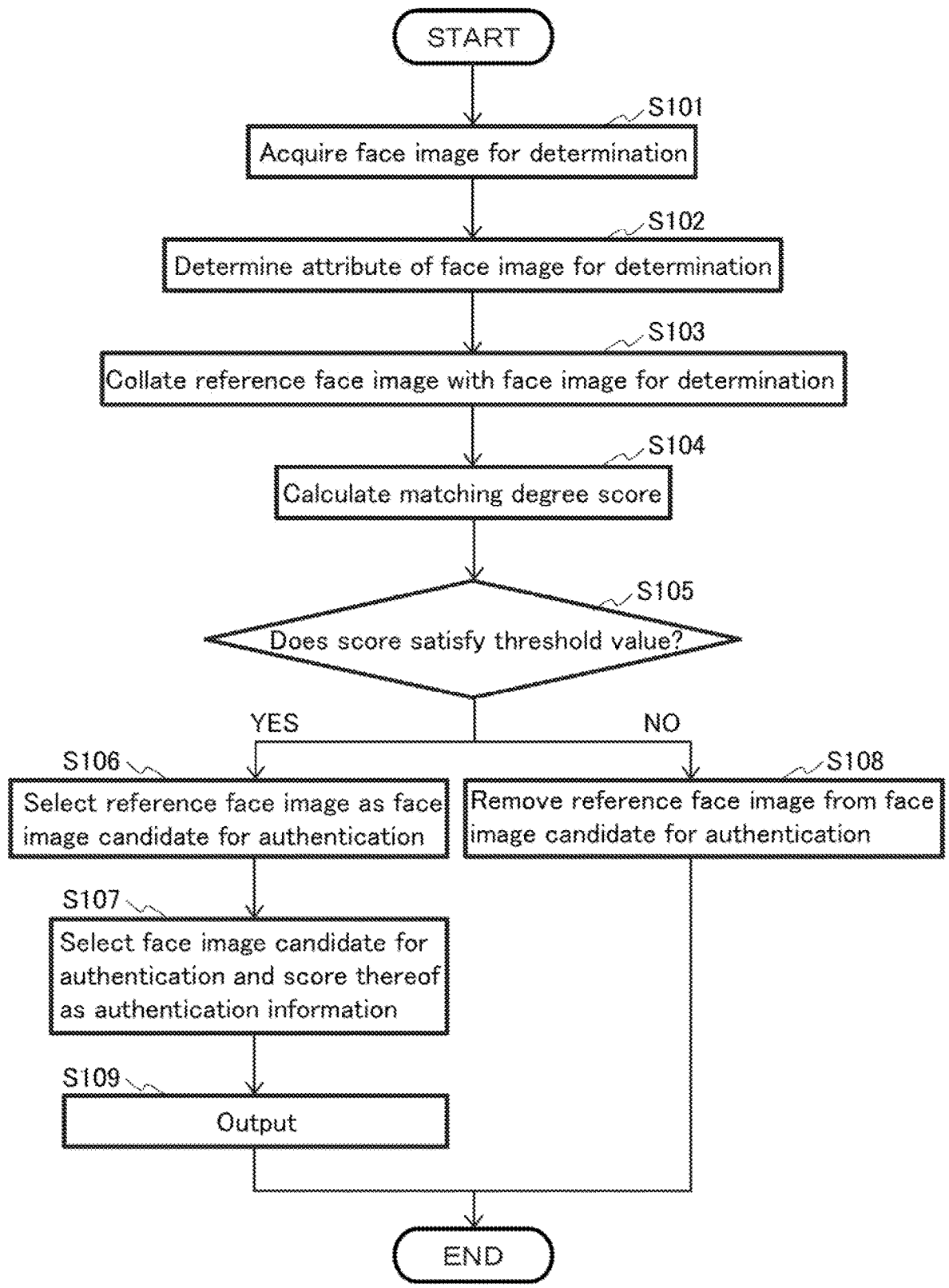
FIG. 3 is a flowchart showing an example of a face image candidate determination method according to the first example embodiment.

Next, the face image candidate determination method according to the first example embodiment of the present invention will be described in more detail with reference to the flowchart of FIG. 3. Note that the face image candidate determination method of the present invention is not limited to these examples.

First, in the storage unit 10 of the face image candidate determination apparatus 1, a reference face image in association with an attribute of the reference face image for each registered person is preliminarily stored in the reference storage unit 112, a score threshold value for each combination of attributes of face images to be collated is preliminarily stored in the threshold value storage unit 113, and these are used. More specifically, as described above, the reference image is stored in association with the attribute thereof for each registered person in the reference storage unit 112. As to the reference face image of the registered person, for example, one type or two or more types may be stored. In the threshold value storage unit 113, the score threshold value summarized in Table 1 is stored for each combination of attributes of face images to be collated.

In the image-acquiring, the image acquisition unit 11 of the face image candidate determination apparatus 1 acquires a face image of a person to be determined as a face image for determination (S101).

In the attribute-determining, the attribute determination unit 12 of the face image candidate determination apparatus 1 determines an attribute of the face image for determination (S102). In this example, a face image is assumed to be an image of a front face with sunglasses.

Then, in the score-calculating, the score calculation unit 13 of the face image candidate determination apparatus 1 collates the reference face image with the face image for determination for each of the attributes (S103), and calculates a score indicating the degree of matching (S104).

Here, for example, it is assumed that an image of a front face with no wearing object such as sunglasses (A), an image of a front face with sunglasses (B), and an image of a front face with a mask (C) are stored for the registered persons A, B, and C, respectively. Then, scores indicating the degree of matching obtained by collating the face image for determination and the reference face image are summarized in Table 2 below as an example. As the score indicating the degree of matching, for example, those of an existing collation engine or the like can be used.

| Reference face image | | Face image for determination | Threshold value of |
|---|---|---|---|
| Registered person | Attribute | attribute: front face Matching degree score | Table 1 attribute × attribute |
| A | Front face | 50 | sunglasses × front face 60 |
| B | Sunglasses | 80 | sunglasses × sunglasses 70 |
| C | Mask | 30 | sunglasses × mask 45 |

Next, in the selecting, the selection unit 14 of the face image candidate determination apparatus 1 determines whether or not the calculated score satisfies the score threshold values of the combinations of attributes (S105). In Table 2, the threshold values of Table 1 are also described in accordance with the respective attribute combinations of the face image for determination and the reference face images (A, B, and C). For example, when the scores indicating the degree of matching of Table 2 are determined based on the threshold values of Table 1 for the respective attribute combinations, it can be determined that only the matching degree score (80) of the face image for determination and the reference face image with sunglasses (B) satisfies the threshold value 70.

When the score satisfies the score threshold value (YES), the reference face image is selected as a face image candidate for authentication (S106), the face image candidate and the calculated score thereof are selected as authentication information (S107), the information is output (S109), and the procedure is ended (END). On the other hand, when the score does not satisfy the score threshold value (NO), the reference face image is removed from the face image candidate for authentication (S108), and the procedure is ended (END). That is, in the example of Table 2, the reference face image with sunglasses (B) is selected as a face image candidate, and the other reference face images (A and C) are removed from the face image candidate.

The authentication information selected in this manner is output (S109). The authentication information can be used to finally determine whether or not a person to be authenticated can be authenticated as the registered person authentication is possible, for example.

In the present example embodiment, when there are multiple face image candidates for authentication selected as satisfying the score threshold value, for example, the face image candidates may be output for each attribute in the order according to the deviation degree of the attribute from the threshold value. Specifically, for example, the values may be output in descending order of a relatively higher value and a relatively larger deviation degree with respect to the threshold value.

While the case is shown in which there is one image satisfying the score threshold value as a result of the selecting in the example of Table 2, for example, when there are two or more images satisfying the score threshold value, the difference between the matching degree score and the threshold value is obtained, and the reference face image with the largest difference may be selected as a reference face image with the highest possibility. Further, for example, multiple reference face images satisfying the score threshold value may be selected and output as rankings having a high possibility in descending order of difference. For example, as shown in Table 3 below, when the matching score of the reference face image A and the matching score of the reference face image B satisfy the respective threshold values, for example, the difference between the matching score and the threshold value is obtained for each image. In this example, since the difference of the reference face image B is larger than the difference of the reference face image A, only the reference face image B may be selected, or the reference face image B may be selected as the first candidate and the reference face image A may be selected as the second candidate in a ranking format.

TABLE 3

| Reference face image | | Face image for determination | | Difference |
|---|---|---|---|---|
| Registered person | Attribute | attribute: front face Matching degree score | Threshold value of Table 1 attribute × attribute | (matching degree score) − (threshold value) |
| A | Front face | 61 | sunglasses × front face 60 | 1 |
| B | Sunglasses | 72 | sunglasses × sunglasses 70 | 2 |
| C | Mask | 30 | sunglasses × mask 45 | — |

Second Example Embodiment

The present example embodiment relates to an aspect in which the face image candidate having the highest score is further extracted for each of the attributes. Regarding the present example embodiment, reference can be made to the description of the first example embodiment unless otherwise mentioned.

The face image candidate determination apparatus of the present example embodiment further includes an extraction unit; and an output unit, wherein the extraction unit extracts a face image candidate having a highest score for each of the attributes based on the authentication information of the face image for determination, and the output unit outputs, for each of the attributes, that the registered person associated with the extracted face image candidate is highly likely to be the person to be determined.

In addition, the face image candidate determination method of the present example embodiment further includes the steps of: extracting; and outputting, wherein the extracting extracts a face image candidate having a highest score for each of the attributes based on the authentication information of the face image for determination, and the outputting outputs, for each of the attributes, that the registered person associated with the extracted face image candidate is highly likely to be the person to be determined.

The extracting can be performed by the extraction unit, for example, and the CPU 101 functions as the extraction unit in the hardware configuration.

As shown in the first example embodiment, a score indicating the degree of matching between the face image for determination and each reference face image is calculated, and the face image candidate is selected according to a threshold value of the combination. Based on the authentication information, it is possible to extract a face image candidate having the highest score for each attribute among the face image candidates collated with the face image for determination. As a specific example, taking Table 2 as an example, when the attribute of the face image candidate is a front face, the front face image of the registered person A shows the highest score, when the attribute is a profile, the profile image of the registered person B shows the highest score, when the attribute is a face with a mask, the image of a face with a mask of the registered person A shows the highest score, and when the attribute is sunglasses, the image of a face with sunglasses of the registered person A shows the highest score. Then, this result can be output as a result for each attribute, that is, a face image candidate that matches the face image for determination the most can be output for each attribute of the face image candidate.

The face image candidate determination apparatus of the present example embodiment is not limited to this example, and for example, the extraction unit may extract face image candidates in the order of scores for each attribute based on the authentication information of the face image for determination, and the output unit may output, for each attribute, that the registered persons in the order of scores associated with the extracted face image candidates are in the order of high possibility of being the person to be determined. In the face image candidate determination method of the present example embodiment, similarly, for example, the extracting may extract face image candidates in the order of scores for each attribute based on the authentication information of the face image for determination, and the outputting may output, for each attribute, that the registered persons in the order of scores associated with the extracted face image candidates are in the order of high possibility of being the person to be determined. That is, the ranking of the degree of matching of the face image candidates may be output for each attribute.

In the present example embodiment, for example, as described above, the ranking may be output for each attribute in the order according to the deviation degree of the attribute from the threshold value (for example, the difference as described above). Further, as the attribute of the face image, for example, since the accuracy of the front face is basically high, the determination may be made with the face image candidate of the front face as the first priority.

As described above, the face image candidate determination apparatus and the face image candidate determination apparatus of the present example embodiment extract the face image candidates in the order of high possibility of being the person to be determined for each attribute, and thus can be referred to as a face image authentication apparatus and a face image authentication method, respectively.

Third Example Embodiment

The program of the present example embodiment is a program for a computer to execute the face image candidate determination methods of the first and second example embodiments. The program of the present example embodiment may be recorded on, for example, a computer readable recording medium. The recording medium is not particularly limited, and may be, for example, a storage medium as described above.

Fourth Example Embodiment

The present example embodiment relates to an example of the face authentication apparatus and the face authentication method of the present invention. The present example embodiment is similar to the face image candidate determination apparatus and the face image candidate determination method of the first and second example embodiments, unless otherwise mentioned, and reference can be made to the description of the first and second example embodiments.

The face authentication apparatus of the present example embodiment includes a face image candidate determination unit and an authentication unit. The face image candidate determination unit includes the face image candidate determination apparatus for authentication according to the present invention and determines a face image satisfying the score threshold value as a face image candidate for authentication for each attribute of the reference face image. The authentication unit authenticates a face image of a person to be determined based on the authentication information of the face image candidate. The face authentication apparatus of the present example embodiment is characterized in that face image candidates are determined based on attributes, and other configurations are not limited in any way. The face authentication apparatus of the present example embodiment may be, for example, the face image candidate determination apparatus of the first or second example embodiment, and the face image candidate determination apparatus of the first or second example embodiment may further include the authentication unit to become the face authentication apparatus.

The face authentication method of the present example embodiment includes the steps of: determining a face image candidate; and authenticating. The face image candidate-determining includes the face image candidate determination method for authentication according to the present invention and determines a face image satisfying the score threshold value as a face image candidate for authentication for each attribute of the reference face image. The authenticating authenticates a face image of a person to be determined based on the authentication information of the face image candidate.

Fifth Example Embodiment

The program of the present example embodiment is a program for a computer to execute the face authentication method of the fourth example embodiment. The program of the present example embodiment may be recorded on, for example, a computer readable recording medium. The recording medium is not particularly limited, and may be, for example, a storage medium as described above.

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2018-167128 filed on Sep. 6, 2018. The entire subject matter of the Japanese Patent Application is incorporated herein by reference.

SUPPLEMENTARY NOTES

Some or all of the above example embodiments and examples may be described as in the following Supplementary Notes, but are not limited thereto.

Supplementary Note 1

A face image candidate determination apparatus for authentication, including:
  a storage unit;
  an image acquisition unit;
  an attribute determination unit;
  a score calculation unit; and
  a selection unit, wherein
  the storage unit includes:
    a reference storage unit; and
    a threshold value storage unit,
    the reference storage unit stores a reference face image in association with an attribute of the reference face image for each registered person,
    the threshold value storage unit stores a score threshold value for each combination of attributes of face images to be collated,
    the attribute is an attribute based on a feature of the face image,
    the score threshold value is a threshold value for determining that face images to be collated are likely to be of the same person,
  the image acquisition unit acquires a face image of a person to be determined as a face image for determination,
  the attribute determination unit determines an attribute of the face image for determination,
  the score calculation unit collates the reference face image with the face image for determination and calculates a score indicating a degree of matching, and
  the selection unit selects a reference face image satisfying the score threshold value as a face image candidate for authentication and selects the face image candidate and a calculated score thereof as authentication information of the face image for determination.

Supplementary Note 2

The face image candidate determination apparatus according to Supplementary Note 1, wherein
  the attribute of the face image is at least one selected from the group consisting of a face orientation, a facial expression, and a wearing object on the face.

Supplementary Note 3

The face image candidate determination apparatus according to Supplementary Note 2, wherein
  the attribute of the face image is at least one selected from the group consisting of a front face, a profile, a look-down face, a look-up face, an obliquely right profile, an obliquely left profile, a smiling face, a face with a hat, a face with a mask, and a face with sunglasses.

Supplementary Note 4

The face image candidate determination apparatus according to any one of Supplementary Notes 1 to 3, further including:

an extraction unit; and
an output unit, wherein
the extraction unit extracts a face image candidate having a highest score for each of the attributes based on the authentication information of the face image for determination, and
the output unit outputs, for each of the attributes, that the registered person associated with the extracted face image candidate is highly likely to be the person to be determined.

Supplementary Note 5

The face image candidate determination apparatus according to any one of Supplementary Notes 1 to 4 further including:
an extraction unit; and
an output unit, wherein
the extraction unit extracts face image candidates in an order of scores for each of the attributes based on the authentication information of the face image for determination, and
the output unit outputs, for each of the attributes, that the registered persons in an order of scores associated with the extracted face image candidates are in an order of high possibility of being the person to be determined.

Supplementary Note 6

A face image candidate determination method for authentication, including the steps of:
storing;
acquiring an image;
determining an attribute;
calculating a score; and
selecting, wherein
the storing includes the steps of:
  storing a reference; and
  storing a threshold value,
    the reference-storing stores a reference face image in association with an attribute of the reference face image for each registered person,
    the threshold value-storing stores a score threshold value for each combination of attributes of face images to be collated,
    the attribute is an attribute based on a feature of a face image,
    the score threshold value is a threshold value for determining that face images to be collated are likely to be of the same person,
the image-acquiring acquires a face image of a person to be determined as a face image for determination,
the attribute-determining determines an attribute of the face image for determination,
the score-calculating collates the reference face image with the face image for determination and calculates a score indicating a degree of matching, and
the selecting selects a reference face image satisfying the score threshold value as a face image candidate for authentication and selects the face image candidate and a calculated score thereof as authentication information of the face image for determination.

Supplementary Note 7

The face image candidate determination method according to Supplementary Note 6, wherein
the attribute of the face image is at least one selected from the group consisting of a face orientation, a facial expression, and a wearing object on the face.

Supplementary Note 8

The face image candidate determination method according to Supplementary Note 7, wherein
the attribute of the face image is at least one selected from the group consisting of a front face, a profile, a look-down face, a look-up face, an obliquely right profile, an obliquely left profile, a smiling face, a face with a hat, a face with a mask, and a face with sunglasses.

Supplementary Note 9

The face image candidate determination method according to any one of Supplementary Notes 6 to 8, further including the steps of:
extracting; and
outputting, wherein
the extracting extracts a face image candidate having a highest score for each of the attributes based on the authentication information of the face image for determination, and
the outputting outputs, for each of the attributes, that the registered person associated with the extracted face image candidate is highly likely to be the person to be determined.

Supplementary Note 10

The face image candidate determination method according to any one of Supplementary Notes 6 to 9, further including the steps of:
extracting; and
outputting, wherein
the extracting extracts face image candidates in an order of scores for each of the attributes based on the authentication information of the face image for determination, and
the outputting outputs, for each of the attributes, that the registered persons in an order of scores associated with the extracted face image candidates are in an order of high possibility of being the person to be determined.

Supplementary Note 11

A program for a computer to execute the method according to any one of Supplementary Notes 6 to 10.

Supplementary Note 12

A computer readable recording medium with the program according to Supplementary Note 11.

Supplementary Note 13

A face image authentication apparatus, including:
a face image candidate determination unit; and
an authentication unit, wherein
the face image candidate determination unit includes:
  the face image candidate determination apparatus for authentication according to any one of Supplementary Notes 1 to 5, determines a face image satisfying the score threshold value as a face image candidate for authentication for each attribute of the reference face image, and the authentication unit authenticates a face image of a person to be determined based on the authentication information of the face image candidate.

Supplementary Note 14

A face image authentication method, including the steps of:

determining a face image candidate; and
authenticating, wherein
the face image candidate-determining includes:
  the face image candidate determination method for authentication according to any one of Supplementary Notes 6 to 10,
  determines a face image satisfying the score threshold value as a face image candidate for authentication for each attribute of the reference face image, and
the authenticating authenticates a face image of a person to be determined based on the authentication information of the face image candidate.

Supplementary Note 15

A program for a computer to execute the method according to Supplementary Note 14.

Supplementary Note 16

A computer readable recording medium with the program according to Supplementary Note 15.

INDUSTRIAL APPLICABILITY

Since the face image candidate determination apparatus, face image candidate determination method, program for executing the same, and computer readable recording medium recording the program of the present invention allow image authentication to be performed with high accuracy regardless of the type of registered master image, for example, they are optimal for face image authentication, for example.

REFERENCE SIGNS LIST

1: face image candidate determination apparatus
10: storage unit
112: reference storage unit
113: threshold value storage unit
11: image acquisition unit
12: attribute determination unit
13: score calculation unit
14: selection unit
101: CPU
102: memory
103: bus
104: input device
105: display
106: communication device
107: storage device
108: program
109: reference face image
110: attribute of face image
111: score threshold value

What is claimed is:

1. An apparatus for face image candidate determination for authentication, comprising:
  a storage storing:
    for each of a plurality of registered persons, a reference face image in association with a face image attribute of the reference face image; and
    for each of a plurality of combinations that each include a first face image attribute and a second face image attribute, a score threshold value indicating a likelihood that a first face image having the first face image attribute and a second face image having the second face image attribute are of a same person upon collation of the first face image and the second face image;
  a processor; and
  a memory storing program code executable by the processor to:
    acquire a target face image of a person to be determined;
    determine a face image attribute of the target face image;
    for each registered person, collate the reference face image with the target face image to calculate a score indicating a degree of matching of the reference face image with the target face image;
    select the reference face image for each registered person for which the score satisfies the score threshold value for the combination including the face image attribute of the reference face image and the face image attribute of the target face image, as one of one or more face image candidates for authentication; and
    select each of the one or more face image candidates and the calculated score thereof as authentication information of the target face image.

2. The apparatus according to claim 1, wherein the face image attribute of the reference face image for each registered person and the face image attribute of the target face image are each at least one selected from the group consisting of a face orientation, a facial expression, and a wearing object on the face.

3. The apparatus according to claim 1, wherein the face image attribute of the reference face image for each registered person and the face image attribute of the target face image are each at least one selected from the group consisting of a front face, a profile, a look-down face, a look-up face, an obliquely right profile, an obliquely left profile, a smiling face, a face with a hat, a face with a mask, and a face with sunglasses.

4. The apparatus according to claim 1, wherein the program code is executable by the processor to further:
  for each of a plurality of attributes in any of the one or more face image candidates, extract the face image candidate having the attribute that has a highest calculated score; and
  for each of the plurality of attributes, output the registered person associated with the extracted face image candidate as highly likely to be the person within the target face image.

5. The apparatus according to claim 1, wherein the program code is executable by the processor to further:
  for each of a plurality of attributes in any of the one or more face image candidates, extract the face image candidates having the attribute in order by the calculated score; and for each of the plurality of attributes, output the registered person associated with each extracted face image candidate having the attribute in an order in which the face image candidates having the attribute have been extracted, as an order of high possibility of being the person within the target face image.

6. A computer-implemented method for a face image candidate determination for authentication, comprising:

storing, by a processor and for each of a plurality of registered persons, a reference face image in association with a face image attribute of the reference face image;

storing, by the processor and for each of a plurality of combinations that each include a first face image attribute and a second face image attribute, a score threshold value indicating a likelihood that a first face image having the first face image attribute and a second face image having the second face image attribute are of a same person upon collation of the first face image and the second face image;

acquiring, by the processor, a target face image of a person to be determined;

determining, by the processor, a face image attribute of the target face image;

collating, by the processor and for each registered person, the reference face image with the target face image to calculate a score indicating a degree of matching of the reference face image with the target face image;

selecting, by the processor, the reference face image for each registered person for which the score satisfies the score threshold value for the combination including the face image attribute of the reference face image and the face image attribute of the target face image, as one of one or more face image candidates for authentication; and selecting, by the processor, each of the one or more face image candidates and the calculated score thereof as authentication information of the target face image.

7. The method according to claim 6, wherein
the face image attribute of the reference face image for each registered person and the face image attribute of the target face image are each at least one selected from the group consisting of a face orientation, a facial expression, and a wearing object on the face.

8. The method according to claim 6, wherein
the face image attribute of the reference face image for each registered person and the face image attribute of the target face image are each at least one selected from the group consisting of a front face, a profile, a look-down face, a look-up face, an obliquely right profile, an obliquely left profile, a smiling face, a face with a hat, a face with a mask, and a face with sunglasses.

9. The method according to claim 6, further comprising:
for each of a plurality of attributes in any of the one or more face image candidates, extracting, by the processor, the face image candidate having the attribute that has a highest calculated score; and for each of the plurality of attributes, outputting, by the processor, the registered person associated with the extracted face image candidate as highly likely to be the person within the target face image.

10. The method according to claim 6, further comprising:
for of the plurality of attributes in any of the one or more face image candidates, extracting, by the processor, the face image candidates having the attribute in ordered by the calculated score; and for each of the plurality of attributes, outputting, by the processor, the registered person associated with each extracted face image candidate having the attribute in an order in which the face image candidates having the attribute have been extracted, as an order of high possibility of the person within the target face image.

11. A non-transitory computer readable recording medium storing a program executable by a computer to perform a method for a face image candidate determination for authentication comprising:

storing, for each of a plurality of registered persons, a reference face image in association with a face image attribute of the reference face image;

storing, for each of a plurality of combinations that each include a first face image attribute and a second face image attribute, a score threshold value indicating a likelihood that a first face image having the first face image attribute and a second face image having the second face image attribute are of a same person upon collation of the first face image and the second face image;

acquiring a target face image of a person to be determined;

determining a face image attribute of the target face image;

collating, for each registered person, the reference face image with the target face image to calculate a score indicating a degree of matching of the reference face image with the target face image;

selecting the reference face image for each registered person for which the score satisfies satisfying the score threshold value for the combination including the face image attribute of the reference face image and the face image attribute of the target face image, as one of one or more face image candidates for authentication; and selecting each of the one or more face image candidates and the calculated score thereof as authentication information of the target face image.

12. The apparatus according to claim 1, wherein the program code is executable by the processor to further:
authenticate the target face image based on the authentication information.

13. The method method according to claim 6, further comprising:
authenticating, by the processor, the target face image based on the authentication information.

* * * * *